Dec. 27, 1966 P. GERMAIN ETAL 3,293,903
APPARATUS FOR ANALYSIS OF GAS MIXTURES
Filed Feb. 24, 1964

INVENTORS
PHILIPPE GERMAIN
MARCEL NICOLAS

By Irwin S. Thompson
ATTY.

United States Patent Office 3,293,903
Patented Dec. 27, 1966

3,293,903
APPARATUS FOR ANALYSIS OF GAS MIXTURES
Philippe Germain and Marcel Nicolas, Paris, France, assignors to L. Air Liquide, Societe Anonyme pour l'Etude et l'Exploitation des Procedes Georges Claude
Filed Feb. 24, 1964, Ser. No. 346,594
Claims priority, application France, Mar. 6, 1963, 926,983, Patent 1,361,936
6 Claims. (Cl. 73—27)

This invention applies in particular to an apparatus for the analysis of gas mixtures of the type known as a katharometer in which use is made of the variations in the electrical resistance of a resistor caused by the flow of current at a temperature greater than that of the gas mixture in which it is immersed, undergoing cooling which is a function of the nature and of the composition of the gas mixture to be analysed. The invention also covers in a more general fashion a gas analysis apparatus comprising an analysis cell made up by two separate compartments through which steady flows of the gas to be analysed and the reference gas may be passed respectively. In the case of a katharometer, these compartments are each fitted with an electrical resistance, these two resistances being incorporated in a measuring circuit such as a Wheatstone bridge; the measurement consists for example in comparing the deflections of a galvanometer with both compartments filled with the reference gas, when the two resistances have in consequence the same value, or values whose ratio is determined solely by their individual characteristics, and with the two compartments filled respectively with the gas to be analysed and the reference gas. These operations require therefore for each analytical operation a double manipulation by the operator.

The apparatus which is the subject of this invention is designed to allow the elimination of these manipulations; it is characterised by the fact that the duct carrying the gas to be analysed to the appropriate compartment, known as the "analysis chamber," is fitted with a ball check-valve preferably arranged vertically, and that the duct taking the reference gas to its respective compartment is connected to the duct carrying gas to be analysed, before the aforesaid valve, by a by-pass also fitted with a ball check-valve and possibly a valve to seal off this check-valve.

Other objects, features and advantages of the invention will become apparent from the following description taken in conjunction with the accompanying drawing.

Figure 1:
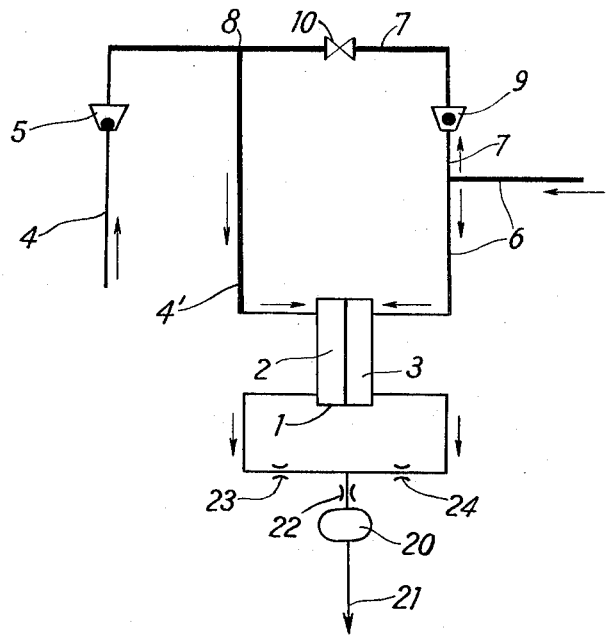
FIGURE 1 is a simplified diagram illustrating the principle of an automatic apparatus based on the invention.

As shown in FIGURE 1, the apparatus comprises an analysis cell 1 containing two separate chambers or compartments 2, 3 each containing a resistor (not indicated) incorporated in a known fashion into a measuring circuit (not indicated). Compartment 2 designed to contain the mixture to be analysed during the analysing operation, is connected to the supply of the mixture by a duct 4, 4' in which is inserted a ball check-valve 5, preferably placed in a vertical position so as to work by gravity. The reference gas supply is connected to the compartment 3 by the duct 6, to which is connected a by-pass 7 rejoining the inlet duct of the gas to be analysed at 8, before the valve 5, this by-pass 7 also containing a ball check-valve 9 similar to the proceeding one. A cock 10, fitted to the by-pass 7 before the valve 9 serves to seal off this latter.

Circulation of the gases with equal steady flow rates is ensured by a vacuum pump 20 delivering at 21 and drawing, via the calibrated orifice 22, on the two compartments of the cell. Another calibrated orifice, 23 or 24, is interposed between each of the compartments and the orifice 22. Orifices 23 and 24 have substantially the same values, and are together equivalent to a single orifice with a section slightly greater than that of the orifice 22.

The functioning of the arrangement represented in FIGURE 1 is as follows:

In the absence of gas to be analysed the reference gas arriving via duct 6 normally fills the reference compartment 3 of the cell 1, lifts the ball of valve 9 and then passes by the open cock 10 and the portion 4' of the duct for the gas to be analysed into the analysis chamber 2 of the cell 1; the same gas has thus flowed through both compartments of the cell. The pressure of the reference gas keeps the ball of valve 5 down on its seat, which cuts communication between analysis chamber 2 and duct 4.

During analysis, the gas mixture to be analysed, which has been brought to a pressure just above that of the reference gas, lifts the ball-valve 5 and enters the analysis chamber 2 by the path 8—4', whilst ball-valve 9 closes under gravity and cuts off communication between the supply points 4 and 6 for the gas to be analysed and the reference gas.

From this moment compartments 2 and 3 are respectively filled with gas to be analysed and reference gas, and measurements can be made.

If, for some reason no more of the gas to be analysed is available, the valve 9 opens and allows entry of the reference gas which then closes off valve 5; the two chambers 2 and 3 are then swept out again by the reference gas.

As is clear from the above description, the functioning of the apparatus requires that the pressure of the gas to be analysed is slightly greater than that of the reference gas so as to cause valve 5 to open and valve 9 to close on arrival of the gas to be analysed. In the arrangement represented in FIGURE 2, this slight over pressure is obtained with the help of an over pressure tube 11, bent in a U, partially filled with some liquid which is inert with respect to the gas to be analysed, for example, oil. The tube 11 has an enlarged portion 12, designed to prevent entry of the inert liquid into the analysis circuits; portion 12 is connected by a duct 13 to the inlet duct 4 carrying the gas to be analysed down-stream the valve 5 and up-stream the point of connection 8 of the by-pass 7. The difference in levels between the oil in the arms of the tube gives the gas to be analysed an over pressure which is sufficient to ensure that its pressure is greater than that of the reference gas. The gas circuits after the analysis cell are controlled by the calibrated orifices, and in order to avoid excessive over pressure in the circuit after the cell, it is necessary to arrange for a constant discharge of the two gases to the atmosphere: to check these discharges the over pressure tube 11 is attached to a flowmeter, whose conical tube is open to the atmosphere, whilst a similar flowmeter 15 is attached to the inlet duct 6 for the reference gas.

A three-way cock 16 is fitted to the duct 4 down-stream the ball-valve 5; this cock allows for the analysis circuit to be cut out and allows the analysis chamber to be swept out or filled at any time with the reference gas; this permits a check to be made on possible zero drift of the calibration curve of the apparatus.

Figure 2:
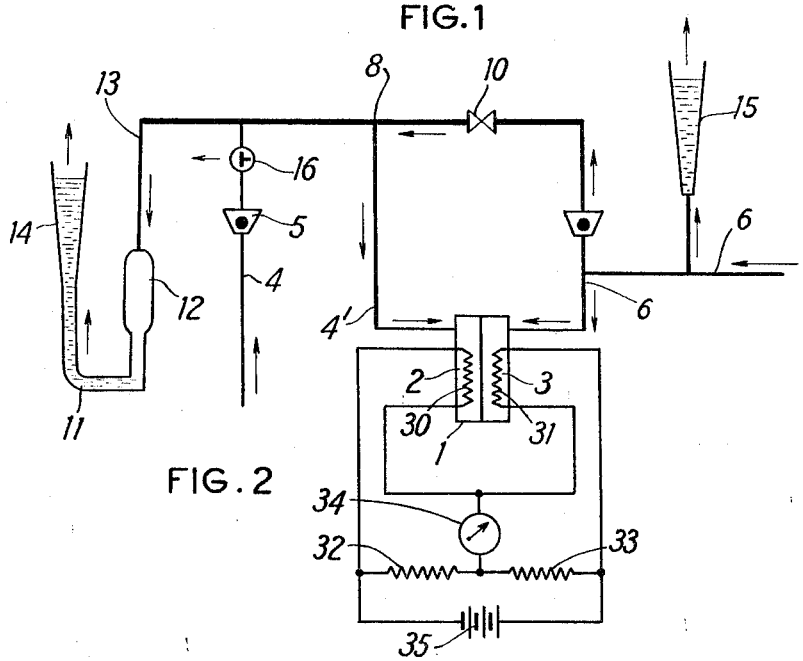
FIGURE 2 represents diagrammatically an embodiment of the apparatus with accessories.

The working of the assembly in FIGURE 2, fitted with the accessories described above, is exactly the same as that described in the case of FIGURE 1.

The applications of this automatic analyser are numerous. For example, the apparatus may be connected to the outlet of an apparatus for the fractionation of gases by adsorption; since the purified gas from such an apparatus flows at the end of the cycle under very low or zero head, the analyser is then totally swept out by the reference gas without any action by the operator.

Another application lies in production checking of a gas, for example in the checking of a series of cylinders: it is sufficient to connect the analyser to a cylinder to obtain the impurity content of the gas in the cylinder by reading a galvanometer, possibly a recording one.

A measuring electric circuit is represented on FIGURE 2. Chamber 2 contains a resistor 30 and chamber 3 a resistor 31. Two other resistors 32 and 33 are connected with resistors 30 and 31 in the manner known as "Wheatstone bridge." One of the diagonals of this bridge contains a galvanometer 34 the deflections of which are read by the user, the other contains a source of current 35 which energizes the galvanometer when the bridge is unbalanced and which heats up resistors 30 and 31. One at least of the resistors 32 and 33 is adjustable in order to bring the deflection to zero when the reference gas flows through both chambers.

What we claim is:

1. An apparatus for the analysis of gas mixtures, comprising a first chamber, first conduit means for connecting a source of the gas to be analyzed to said first chamber, a second chamber, second conduit means for connecting a source of reference gas to said second chamber, measuring means sensitive to the difference in characteristics of the gases in said chambers, a first check valve in said first conduit means for allowing the passage of gas from the source of gas to be analyzed into said first chamber, by-pass conduit means from said second conduit means to a point in said first conduit means between said first check valve and said first chamber, and a second check valve in said by-pass conduit means for allowing the passage of reference gas from the source thereof into said first conduit means, said first check valve preventing the passage of reference gas therethrough and said second check valve preventing the flow of gas to be analysed therethrough said analysed gas being of greater pressure than said reference gas during at least one portion of said analysis.

2. An apparatus as in claim 1, said measuring means comprising a first resistor in said first chamber, a second resistor in said second chamber and a measuring electric circuit incorporating said resistors.

3. An apparatus as in claim 1, said check valves having substantially vertically movable valve members.

4. An apparatus as in claim 1, further comprising a valve in the by-pass conduit means for preventing the flow of gas through said second check valve.

5. An apparatus as in claim 1, further including a U-shaped over-pressure tube partially filled with a liquid for making the pressure of the gas to be analysed slightly greater than that of the reference gas and a flowmeter; conduit means for connecting one end of said U-shaped tube to the said first conduit means between said first check valve and said by-pass conduit means, conduit means for connecting the other end of said U-shaped tube to the inlet end of the said flowmeter, and the outlet end of said flowmeter opening to the atmosphere.

6. An apparatus as claimed in claim 1, and means for maintaining the flow rates of the gases through the two chambers equal to each other.

References Cited by the Examiner

UNITED STATES PATENTS

| | | | |
|---|---|---|---|
| 1,954,681 | 4/1934 | Oetjen | 73—27 |
| 3,015,227 | 1/1962 | Barber | 73—23.1 |
| 3,100,984 | 8/1963 | Martin | 73—23.1 |
| 3,146,223 | 8/1964 | Cheney | 73—26 X |

OTHER REFERENCES

Minter, C. J., Use of Convection Effects In Gas Analysis by Thermal Conductivity. In Analytical Chemistry, vol. 19, p. 464, July 1947. (Copy in 73–27.)

White, L. J., Exhaust Gas Analysis Promotes Gasoline Engine Efficiency. In Instruments, vol. 7, pp. 64–66, April 1934. (Copy in 73–27.)

RICHARD C. QUEISSER, *Primary Examiner.*

J. J. SMITH, *Assistant Examiner.*